(12) United States Patent
Nakane

(10) Patent No.: US 8,375,748 B2
(45) Date of Patent: Feb. 19, 2013

(54) GLASS MANUFACTURING CONTAINER, GLASS MANUFACTURING APPARATUS WITH THE SAME AND GLASS MANUFACTURING METHOD USING GLASS MANUFACTURING APPARATUS

(75) Inventor: Shingo Nakane, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 12/909,994

(22) Filed: Oct. 22, 2010

(65) Prior Publication Data

US 2011/0048076 A1   Mar. 3, 2011

Related U.S. Application Data

(63) Continuation of application No. PCT/JP2010/063904, filed on Aug. 18, 2010.

(30) Foreign Application Priority Data

Aug. 26, 2009  (JP) ................. 2009-195653

(51) Int. Cl.
*C03B 5/08* (2006.01)
(52) U.S. Cl. ....... 65/374.11; 65/347; 266/280; 266/282; 266/286; 428/34.4
(58) Field of Classification Search .............. 428/457, 428/469, 472, 472.1, 34.4, 34.6, 470, 471, 428/472.2; 264/30, 681; 266/280, 282, 286; 65/141, 178, 335, 336, 346, 347, 374.11
See application file for complete search history.

(56) References Cited

U.S. PATENT DOCUMENTS

| | | | | | |
|---|---|---|---|---|---|
| 3,436,203 | A | * | 4/1969 | Wu | ................... 428/446 |
| 4,159,353 | A | * | 6/1979 | Adelsberg et al. | ............ 427/454 |
| 2004/0067369 | A1 | | 4/2004 | Ott et al. | |
| 2005/0050923 | A1 | * | 3/2005 | Grzesik et al. | ............... 65/135.6 |
| 2008/0057275 | A1 | | 3/2008 | Grzesik et al. | |

FOREIGN PATENT DOCUMENTS

| | | |
|---|---|---|
| JP | 10-103877 A | 4/1998 |
| JP | 10-182166 A | 7/1998 |
| JP | 2001-500098 A | 1/2001 |
| JP | 2001-503008 A | 3/2001 |
| JP | 2004-523449 A | 8/2004 |
| JP | 2006-522001 A | 9/2006 |
| JP | 2008-201617 A | 9/2008 |
| JP | 2008-266092 A | 11/2008 |
| JP | 2010-502549 A | 1/2010 |
| JP | 2010-502550 A | 1/2010 |
| WO | 98/03442 A1 | 1/1998 |
| WO | 98/18731 A2 | 5/1998 |
| WO | 2004/083134 A1 | 9/2004 |
| WO | 2008/027480 A2 | 3/2008 |
| WO | 2008/027482 A2 | 3/2008 |

OTHER PUBLICATIONS

Official Communication issued in International Patent Application No. PCT/JP2010/063904, mailed on Sep. 14, 2010.

* cited by examiner

*Primary Examiner* — Matthew Daniels
*Assistant Examiner* — Yana Belyaev
(74) *Attorney, Agent, or Firm* — Keating & Bennett, LLP

(57) ABSTRACT

A glass manufacturing container includes a container body and an electron donor. The container body is made of a precious metal or an alloy containing a precious metal and has an inner surface to be brought into contact with molten glass and an outer surface kept from contact with molten glass. The electron donor is electrically connected to the outer surface of the container body. The electron donor is made of an electron donating material capable of donating electrons to the container body at operating temperatures.

7 Claims, 10 Drawing Sheets

GLASS MANUFACTURING CONTAINER, GLASS MANUFACTURING APPARATUS WITH THE SAME AND GLASS MANUFACTURING METHOD USING GLASS MANUFACTURING APPARATUS

BACKGROUND OF THE INVENTION

1. Field of the Invention

The present invention relates to a glass manufacturing container, a glass manufacturing apparatus with the same and a glass manufacturing method using the glass manufacturing apparatus, and particularly relates to a glass manufacturing container including a container body made of a precious metal or an alloy containing a precious metal, a glass manufacturing apparatus with the same and a glass manufacturing method using the glass manufacturing apparatus.

2. Description of Related Art

Conventionally, there is generally used, as an industrial glass manufacturing method, a method including the steps of: melting glass raw material; refining the molten glass; and forming the refined molten glass. Examples of a container for manufacturing glass include a container made of a refractory and a container made of Pt or an alloy containing Pt.

In manufacturing glass not required to have very high grade in terms of foreign substances and bubbles, such as window glass, a container made of a refractory is sometimes used as a container for manufacturing glass. On the other hand, in manufacturing glass required to have high grade in terms of foreign substances and bubbles, such as substrate glass for LCDs or like displays, a container made of a precious metal, such as Pt, Ir or Rh, or an alloy containing a precious metal, such as Pt, Ir or Rh, is generally used. The reason for this is that when a container made of a precious metal, such as Pt, Ir or Rh, or an alloy containing a precious metal (hereinafter referred to as a "precious metal container") is used for glass manufacturing, foreign substances and the like are less likely to be mixed from the container into molten glass.

However, when a precious metal container is used for glass manufacturing, bubbles due to water in glass may be formed on the surface of the precious metal container facing molten glass. The reason for the formation of bubbles can be attributed to the fact that hydrogen produced by decomposition of water contained in the glass passes through the precious metal container and is then released to the outside, whereby the oxygen concentration of the molten glass located near the surface of the precious metal container increases. More specifically, it can be assumed that hydrogen gas produced by the reaction represented by the following formula (1) passes through the precious metal container and is then released to the outside, while oxygen not passing through the precious metal container is left in the molten glass located near the surface of the precious metal container, whereby the oxygen concentration of the molten glass located near the surface of the precious metal container increases and bubbles are thereby formed.

$$OH^- \rightarrow \tfrac{1}{2}O_2 + \tfrac{1}{2}H_2 + e^- \qquad (1)$$

In view of this problem, for example, Patent Documents 1 to 5 listed below propose methods that can reduce the formation of bubbles due to water in glass when a container made of Pt or an alloy containing Pt (hereinafter referred to as a "Pt container") is used.

For example, Patent Document 1 below describes a method for reducing the formation of bubbles due to water in glass by reducing the β-OH value of the glass to less than approximately 0.5/mm.

Patent Document 2 below describes a method for reducing the formation of bubbles due to water in glass by controlling, during glass manufacturing, the partial pressure of hydrogen on the outside of the Pt container relative to the partial pressure of hydrogen in the Pt container.

Patent Documents 3 and 4 below describe a method for reducing the formation of bubbles due to water in glass by applying a glass barrier coating on the outer surface of the Pt container to reduce the hydrogen permeability of the Pt container.

Patent Document 5 below describes a method for reducing the formation of bubbles due to water in glass by forming, on the outer surface of the Pt container, a layer made of alumina-based ceramic particles containing 0.2% to 5% by weight of Fe, in terms of $Fe_2O_3$, relative to the total amount of alumina-based ceramic particles and having a changing point, at which the Fe redox ratio increases, within the temperature range of molten glass.

CITATION LIST

Patent Document

Patent Document 1: Japanese Unexamined Patent Application Publication No. 2001-500098
Patent Document 2: Japanese Unexamined Patent Application Publication No. 2001-503008
Patent Document 3: Japanese Unexamined Patent Application Publication No. 2006-522001
Patent Document 4: Japanese Unexamined Patent Application Publication No. 2004-523449
Patent Document 5: Japanese Unexamined Patent Application Publication No. 2008-266092

BRIEF SUMMARY OF THE INVENTION

However, because the β-OH value of glass is influenced by the glass melting conditions, the method described in Patent Document 1 limits the glass melting conditions. Therefore, for example, if the glass melting conditions are limited by another condition, the formation of bubbles may not be able to be sufficiently reduced. In addition, the glass melting conditions may be changed by some disturbance, whereby bubbles may be formed.

If the formation of bubbles is to be reduced by increasing the partial pressure of hydrogen on the outside of the Pt container as described in Patent Document 2, it is necessary to uniformly increase the partial pressure of hydrogen around the entire Pt container. However, in order to retain the shape of the Pt container in a high-temperature atmosphere, the Pt container must be, for example, enclosed with a refractory, which makes it difficult to uniformly increase the partial pressure of hydrogen around the entire Pt container. For example, if the partial pressure of hydrogen around part of the Pt container is lower than the desired partial pressure of hydrogen, bubbles may be formed on the inner surface of the part of the Pt container.

In the method for reducing the formation of bubbles by applying a glass barrier coating on the outer surface of the Pt container as described in Patent Documents 3 and 4, in order to ensure that the formation of bubbles is reduced, the entire outer surface of the Pt container must be coated with the barrier coating layer. However, because the Pt container used for glass melting is typically used at high temperatures over 1000° C., the barrier coating film may be changed in quality or shrunk as time passes, so that the Pt container may have a part not covered with the barrier coating film. Furthermore, generally, the Pt container and the barrier coating film have different coefficients of thermal expansion. Therefore, with changes in temperature of the Pt container, the coating film may be peeled off, so that the Pt container may have a part not covered with the barrier coating film. If the Pt container has a part not covered with the barrier coating film, bubbles may be formed on the inner surface of the part not covered with the barrier coating film.

In order to reduce the formation of bubbles by forming on the outer surface of the Pt container a layer of alumina-based ceramic particles having a changing point at which the Fe redox ratio increase as described in Patent Document 5, it is necessary to keep the Pt container and the layer of alumina-based ceramic particles at a constant temperature. However, it is difficult to keep the molten glass at a constant temperature during the actual manufacturing process. Therefore, it is difficult to sufficiently reduce the formation of bubbles according to the method described in Patent Document 5.

In addition, Fe contained in the layer of alumina-based ceramic particles having a changing point ratio at which the Fe redox ratio increases is oxidized by contact with oxygen in the air. Therefore, according to the method described in Patent Document 5, the formation of bubbles may be able to be reduced only temporarily.

The present invention has been made in view of the foregoing points, and an object thereof is therefore to provide a glass manufacturing container less likely to form bubbles in molten glass.

As described previously, the reason why bubbles are formed when a precious metal container is used for glass manufacturing can be attributed to the fact that hydrogen gas produced by the reaction represented by the formula (1) below passes through the precious metal container and is then released to the outside, while oxygen not passing through the precious metal container is dissolved in molten glass located near the surface of the precious metal container, whereby the oxygen concentration of the molten glass located near the surface of the precious metal container increases. Therefore, it is conceivable as a measure for reducing the formation of bubbles to inhibit the progression of the reaction in the following formula (1).

$$OH^- \rightarrow \tfrac{1}{2}O_2 + \tfrac{1}{2}H_2 + e^- \qquad (1)$$

Conventionally, a measure of increasing the partial pressure of hydrogen on the outside of the precious metal container, such as a Pt container, (on the opposite side thereof to molten glass) is proposed as a measure for inhibiting the progression of the reaction in the above formula (1). However, as described previously, it is difficult to uniformly increase the hydrogen partial pressure on the outside of the entire precious metal container. In view of this, the inventor has conducted intensive studies on other measures that can inhibit the progression of the reaction in the above formula (1). As a result, the inventor has found that the use of an electron donating material enables increase in concentration of electrons ($e^-$) on the surface of the precious metal container facing molten glass and in turn enables the progression of the reaction in the above formula (1) to be inhibited, and has completed the present invention.

Specifically, a glass manufacturing container according to the present invention includes: a container body made of a precious metal or an alloy containing a precious metal and having an inner surface to be brought into contact with molten glass and an outer surface kept from contact with the molten glass; and an electron donor electrically connected to the outer surface of the container body and made of an electron donating material capable of donating electrons to the container body at operating temperatures.

In the present invention, an electron donor made of an electron donating material capable of donating electrons to the container body is electrically connected to the container body. Therefore, electrons are supplied from the electron donor to the container body at operating temperatures, i.e., within the temperature range from 500° C. to 1800° C. within which glass is melted, more preferably within the temperature range from 1000° C. to 1800° C. Thus, when the glass manufacturing container of the present invention is used, the electron concentration in the container body can be increased during glass manufacturing. As a result, the progression of the above formula (1) can be inhibited. Hence, during glass manufacturing, the formation of bubbles due to water contained in glass can be effectively reduced.

As described above, in the present invention, the formation of bubbles is reduced by the action of electrons being donated from the electron donor to the container body. In addition, since the container body has electrical conductivity, electrons donated from the electron donor to the container body can freely move through the container body. Therefore, in the present invention, the electron donor need only be electrically connected to at least part of the outer surface of the container body, and need not necessarily be connected to the entire outer surface of the container body. In other words, the electron donor may be in contact with part of the outer surface of the container body, and the outer surface of the container body may have a part kept from contact with the electron donor. For example, if the electron donor is brought into contact with even part of the outer surface of the container body, the effects of the present invention can be achieved. There is also no need to apply a voltage between the container body and the electron donor from the outside. Hence, the glass manufacturing container of the present invention can be easily manufactured.

If, for example, a barrier coating layer is formed on the outer surface of the container body, cracks produced in the barrier coating layer or peeling of the barrier coating layer from the container body would make it impossible to sufficiently reduce the formation of bubbles. In contrast, according to the present invention, the formation of bubbles can be effectively reduced even if part of the outer surface of the container body has fallen out of contact with the electron donor.

As described above, in the present invention, the outer surface of the container body need not necessarily be covered with the electron donor. Therefore, the electron donor need not necessarily be formed into a film. For example, the electron donor may be made of particles. Specifically, for example, the inner surface of a container made of a refractory may be covered with a particulate electron donor, and a container body may be placed on the electron donor. Alternatively, for example, a container body may be placed in a container made of a refractory, and a particulate electron donor may be filled in between the container body and the inner surface of the container. In these cases, a glass manufacturing container can be more easily manufactured, for example, as compared to the case where the electron donor is formed into a film to cover the outer surface of the container body with the electron donor.

However, from the standpoint of efficiently supplying electrons to the container body to more effectively reduce the formation of bubbles due to water in glass, the part of the outer surface of the container body in contact with the electron donor preferably has a large area, and more preferably the electron donor is in contact with the entire outer surface of the container body.

Hence, for example, a particulate electron donor is preferably filled in between the entire outer surface of the container body and the inner surface of the container made of a refractory. More preferably, the entire outer surface of the container body is covered with a film made of a sintered body of an electron donating material.

Note that in the present invention the term "glass manufacturing container" means a member having an inner surface to be brought into contact with molten glass and an outer surface kept from contact with the molten glass. Therefore, examples of the "glass manufacturing container" include a member capable of storing molten glass, a pipe for carrying molten glass, and a forming member. The term "forming member" used herein refers to a member used to form molten glass into a product having a predetermined shape. Therefore, examples of the "forming member" include a molding sleeve, a gutter-shaped forming body used in a downdraw process, and a nozzle.

In the present invention, the container body is not particularly limited so long as it is made of a precious metal or an alloy containing a precious metal. However, since the glass manufacturing container of the present invention is used in a high-temperature atmosphere, it is preferably one having a rigidity exceeding a certain level in a high-temperature atmosphere. For example, the container body is preferably made of Pt, Ir, Rh or an alloy containing at least one of Pt, Ir and Rh. The container body is particularly preferably made of Pt or an alloy containing Pt.

Furthermore, the container body may be doped with another metal element or another metal oxide, such as Zr or a Zr oxide, for the purpose of improving the rigidity of the container body. In other words, in the present invention, a precious metal or an alloy containing a precious metal constituting the container body may be doped with another element.

The electron donating material is not particularly limited so long as it is a material that can donate electrons to the container body.

The electron donating material may be, for example, a material whose Fermi level is at a higher energy level than that of the container body. An example of such a material is an n-type ceramic, such as an n-type oxide ceramic, exhibiting n-type characteristics at room temperature, i.e., at 25° C. Note that in the present invention high Fermi level means proximity to the vacuum level, while low Fermi level means being remote from the vacuum level.

Specific preferred examples of the electron donating material include oxides containing one or more kinds of metals selected from the group consisting of Zn, Mg, Ti, Sn and Al. More specifically, examples of the electron donating material include $ZnO$, $SnO_2$, $TiO_2$ and $SrTiO_3$. The more preferred electron donating materials among them include a ZnO ceramic, which is a kind of n-type intrinsic semiconductor ceramic that can be thermally excited, and a ZnO ceramic doped with a metal, such as Al.

In the present invention, the electron acceptor is preferably electrically connected to an electron donor. This is because as will be indicated by the results of the examples to be hereinafter described, the formation of bubbles can be effectively reduced by electrically connecting the electron acceptor to the electron donor. The reason for this can be attributed to the fact that a pn junction is created at the contact surface between the electron donor and the electron acceptor, and electrons are excited at the junction plane by thermal energy to thereby enhance the electron donating ability of the electron donor.

The electron acceptor may be in contact or kept from contact with the container body so long as it is in contact with the electron donor. However, the electron acceptor is preferably in contact with, not both the electron donor and the container body, but only the electron donor because the formation of bubbles can be more effectively reduced as will be indicated by the result of an example to be hereinafter described.

The electron acceptor is preferably a material whose Fermi level is at a lower energy level than that of the electron donating material. The electron acceptor may be, for example, a p-type ceramic, such as a p-type oxide ceramic, exhibiting p-type characteristics at room temperature, i.e., at 25° C. Specifically, for example, the electron acceptor may be a p-type oxide ceramic made of an oxide containing one or more kinds of metals selected from the group consisting of Cu, Ni, Co, Mn and Li. The electron acceptor is particularly preferably NiO doped with Li.

The Fermi level of the electron acceptor is preferably higher than that of the precious metal used for the container, such as Pt. This is because if the Fermi level of the electron acceptor is lower than that of the precious metal used for the container, partial contact of the electron acceptor with the precious metal container, such as a Pt container, accidentally caused during installation, for example, might promote the formation of bubbles at the interface with the precious metal.

A glass manufacturing apparatus according to the present invention includes the above glass manufacturing container according to the present invention. Therefore, by using the glass manufacturing apparatus according to the present invention, glass can be manufactured which has less bubble left therein.

The glass manufacturing apparatus of the present invention may include: a melting container for melting glass raw material; a refining container for refining the molten glass; a stirring container for stirring the refined molten glass; a forming member for forming the molten glass; a first connecting member in which a connecting passage connecting the melting container to the refining container is formed; a second connecting member in which a connecting passage connecting the refining container to the stirring container is formed; and a third connecting member in which a connecting passage connecting the stirring container to the forming member is formed, wherein at least one of the melting container, the refining container, the stirring container, the forming member and the first to third connecting members is composed of the glass manufacturing container according to the present invention. Particularly preferably, each of the refining container, the stirring container, the forming member and the second and third connecting members, excluding the melting container and the first connecting member, is composed of the glass manufacturing container according to the present invention. According to this structure, the residence of bubbles in glass can be more effectively reduced.

A method for manufacturing glass according to the present invention uses the above glass manufacturing apparatus according to the present invention. Therefore, according to the method for manufacturing glass according to the present invention, glass can be manufactured which has less bubble left therein.

In the present invention, the type of glass to be manufactured is not particularly limited. However, because in manufacturing glass having a β-OH value of 0.1/mm or more bubbles are easily to be formed, the present invention can be more suitably applied to such a case. More particularly, the present invention can be still more suitably applied to the manufacturing of glass having a β-OH value of 0.3/mm or more, more preferably 0.4/mm or more.

Note that the term "β-OH" in the present invention refers to an index showing the amount of water contained in glass and can be represented by the following equation.

$$(\beta\text{-OH}) = (1/X)\log 10(T_1/T_2)$$

where

X represents the glass thickness (mm),

T1 represents the transmittance (%) at a reference wavelength of 3846 cm$^{-1}$ (=2600 nm), and T2 represents the minimum transmittance (%) around the hydroxyl absorption wavelength of 3600 cm$^{-1}$ (=2800 nm), i.e. 3400 to 3700 cm$^{-1}$.

Furthermore, in manufacturing a glass substrate for a display, it is strongly desired that no bubble should be left in glass. Therefore, the present invention can be more suitably applied to the manufacturing of such a glass substrate.

According to the present invention, during glass manufacturing, the formation of bubbles due to water contained in glass can be effectively reduced, and the residence of bubbles in the glass can be effectively reduced.

DETAILED DESCRIPTION

Hereinafter, the present invention will be described with reference to illustrative preferred embodiments practicing the present invention, but is not at all limited by the following embodiments.

(First Embodiment)

Figure 1:
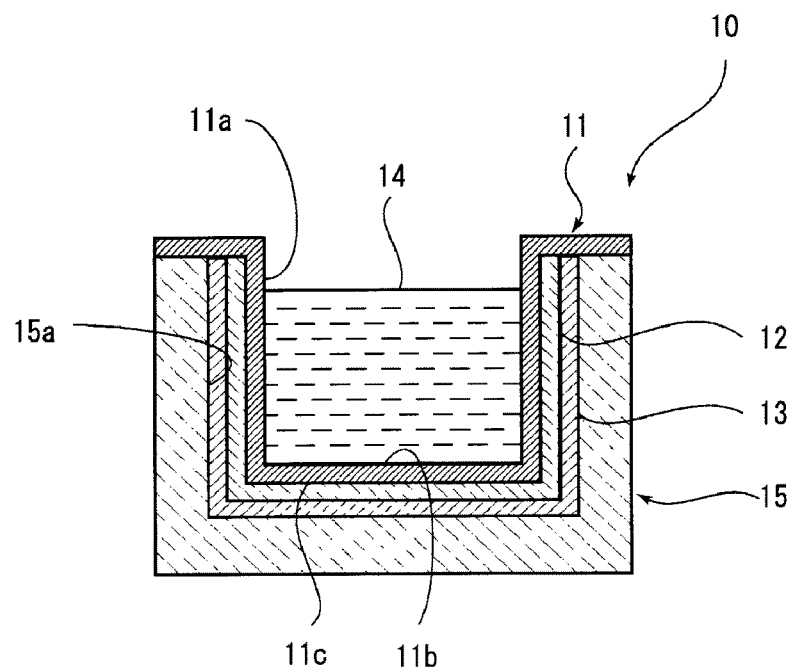
FIG. 1 is a schematic cross-sectional view of a glass manufacturing container of the first embodiment.

FIG. 1 is a schematic cross-sectional view of a glass manufacturing container of the first embodiment. In this embodiment, a description will be given of a glass manufacturing container 10, which is a kind of glass manufacturing container, with reference to FIG. 1.

As shown in FIG. 1, the glass manufacturing container 10 includes a container body 11, an electron donor 12 and an electron acceptor 13. The glass manufacturing container 10 is placed in a recess 15a formed in a refractory 15. Specifically, the container body 11 is disposed in the recess 15a. Disposed between the container body 11 and the refractory 15 are the electron donor 12 and the electron acceptor 13 in this order of proximity to the container body 11.

The glass manufacturing container 10 of this embodiment is provided with an AC source or an additional heated body and configured to be heated by direct heat application from the AC source or by the additional heated body.

The container body 11 is made of a precious metal or an alloy containing a precious metal. Specific Examples of the precious metal include Pt, Au, Ir and Rh. Examples of the alloy containing a precious metal include Pt—Rh alloy, Pt—Au alloy, Ir—Rh alloy and Pt—Ir alloy. The container body 11 is particularly preferably made of Pt or an alloy containing Pt. The reasons for this are that Pt or alloys containing Pt have relatively high strength at high temperatures, and that they are less likely to be eluted into molten glass.

The container body 11 may be doped with another metal element or another metal oxide, such as Zr or a Zr oxide, for example, for the purpose of improving the rigidity and strength. For example, the container body 11 may be made of Pt doped with Zr.

In this embodiment, the container body 11 is formed into a bowl shape, and a recess 11a capable of storing molten glass 14 is formed in the container body 11. Thus, the container body 11 has an inner surface 11b to be brought into contact with molten glass 14, and an outer surface 11c kept from contact with molten glass 14.

The outer surface 11c of the container body 11 is electrically connected to the electron donor 12. Specifically, in this embodiment, the electron donor 12 is provided to come into direct contact with the outer surface 11c of the container body 11. More specifically, the electron donor 12 is disposed in contact with the whole area of a part of the outer surface 11c of the container body 11 located on the outside of the recess 11a.

Note that herein the electron donor 12 is made of an electron donating material capable of donating electrons to the container body 11 within the temperature range from 500° C. to 1800° C., preferably within at least a partial range of the temperature range from 1000° C. to 1800° C. In other words, the electron donor 12 is made of an electron donating material capable of donating electrons to the container body 11 when heated to the temperature at which glass is melted. Therefore, when glass is melted using the glass manufacturing container 10 of this embodiment, electrons (e⁻) are supplied from the electron donor 12 to the container body 11 during glass melting, whereby the progression of the following formula (1) causing the formation of oxygen bubbles can be inhibited. Hence, the formation of oxygen bubbles can be reduced.

$$OH^- \rightarrow \tfrac{1}{2}O_2 + \tfrac{1}{2}H_2 + e^- \quad (1)$$

Since in this embodiment the container body 11 is made of a precious metal or an alloy containing a precious metal, the container body 11 has electrical conductivity. Therefore, electrons supplied from the electron donor 12 to the container body 11 can freely move through the container body 11. Thus, if electrons can supplied to part of the container body 11, the electron concentration of the entire container body 11 can be increased. Hence, if the progression of the above formula (1) is to be inhibited by electron supply, the electron donor 12 need only be electrically connected to at least part of the outer surface 11c of the container body 11. For example, the outer surface 11c of the container body 11 may have a part kept from electrical connection with the electron donor 12. Therefore, the glass manufacturing container 10 of this embodiment can be easily manufactured.

If a barrier coating layer is formed on the outer surface of the container body, cracks produced in the barrier coating layer or peeling of the barrier coating layer from the container body would make it impossible to sufficiently reduce the formation of bubbles. In contrast, according to the glass manufacturing container 10 of this embodiment, the formation of bubbles can be effectively reduced even if part of the outer surface 11c of the container body 11 has fallen out of contact with the electron donor 12.

In this embodiment, the electron donating material is not particularly limited so long as it is a material that can supply electrons to the container body 11 at glass melting temperatures. For example, the electron donating material may be a metal or an oxide. Alternatively, the electron donor 12 may be a ceramic, such as an oxide ceramic.

Furthermore, the electron donor 12 may be made of particles or, if for example the particles are ceramic particles, may be made of a film of sintered body. Since in this embodiment the outer surface 11c of the container body 11 need not necessarily be fully covered with the electron donor 12, the effect of reducing the formation of bubbles can be sufficiently performed even if the electron donor 12 is made of particles.

In this embodiment, specifically, the electron donor 12 constituted by the layer made of particles of an electron donating material is filled in to come into contact with the whole area of the part of the outer surface 11c of the container body 11 located on the outside of the recess 11a. According to this structure, the electron donor 12 can be easily disposed regardless of the shape and size of the container body 11.

The electron donating material may be, for example, an n-type ceramic, such as an n-type oxide ceramic, whose Fermi level is at a higher energy level than that of the container body 11.

Specific preferred examples of the electron donating material include oxides containing one or more kinds of metals selected from the group consisting of Zn, Mg, Ti, Sn and Al. More specifically, examples of the electron donating material include ZnO, SnO₂, TiO₂ and SrTiO₃. The more preferred electron donating materials among them are a ZnO ceramic, which is a kind of n-type intrinsic semiconductor ceramic that can be thermally excited, and a ZnO ceramic doped with a metal, such as Al.

In this embodiment, the container further includes the electron acceptor 13 provided to be electrically connected to the electron donor 12. Specifically, the electron acceptor 13 constituted by a layer made of particles of an electron accepting material is disposed in contact with the electron donor 12. The electron acceptor 13 is provided on the outside of the electron donor 12 so as to be kept from contact with the part of the container body 11 located on the outside of the recess 11a.

By disposing the electron acceptor 13 to electrically connect the electron donor 12 in this manner, the formation of bubbles due to water or OH⁻ ions in molten glass can be effectively reduced as will be demonstrated by the examples to be hereinafter described.

The electron acceptor 13 is preferably a material whose Fermi level is at a lower energy level than that of the electron donating material. The electron acceptor 13 may be, for example, a p-type ceramic, such as a p-type oxide ceramic, exhibiting p-type characteristics at room temperature, i.e., at 25° C. Specifically, for example, the electron acceptor 13 may be a p-type oxide ceramic made of an oxide containing one or more kinds of metals selected from the group consisting of Cu, Ni, Co, Mn and Li.

Examples of the electron acceptor 13 include NiO doped with Li, CoO doped with Li, FeO doped with Li, MnO doped with Li, Bi₂O₃ doped with Ba, Cr₂O₃ doped with Mg, LaCrO₃ doped with Sr, LaMnO₃Cu₂O doped with Sr, CuAlO₂, NaCO₂O₄ and CaMnO₃. The particularly preferred electron acceptor 13 among them is NiO doped with Li. In this case, for example, even if during installation the electron acceptor 13 accidentally comes into contact with the precious metal container, such as a Pt container, the formation of bubbles is less likely to be promoted.

The electron acceptor 13 may be disposed in direct contact with the container body 11. However, since the member for donating electrons to the container body 11 is the electron donor 12, the electron acceptor 13 is preferably disposed so as to be kept from direct contact with the container body 11 in order that the contact area between the container body 11 and the electron donor 12 can be increased.

The above effect of reducing the formation of bubbles can be achieved in melting any kind of glass. Therefore, the glass manufacturing container 10 of this embodiment can be suitably used for the melting of any kind of glass. For example, the glass manufacturing container 10 can be suitably used for the melting of silicate glass, borosilicate glass, borophosphate glass, phosphate glass and the like. Particularly in manufacturing glass having a β-OH value of 0.1/mm or more, bubbles are easily formed. Therefore, the glass manufacturing container 10 of this embodiment can be more suitably used for the manufacturing of glass having a β-OH value of 0.1/mm or more. More particularly, the glass manufacturing container 10 of this embodiment can be still more suitably applied to the manufacturing of glass having a β-OH value of 0.3/mm or more, more preferably 0.4/mm or more.

Furthermore, in manufacturing a glass substrate for a display, it is strongly desired that no bubble should be left in glass. Therefore, the glass manufacturing container 10 of this embodiment can be more suitably used for the manufacturing of a glass substrate for a display.

The method for manufacturing the glass manufacturing container 10 of this embodiment is not particularly limited, and the glass manufacturing container 10 can be manufactured in the following manner, for example.

First, a refractory 15 is prepared. A sheet made such as of paper for forming an electron donor 12 and an electron acceptor 13 is placed over the refractory 15, and a container body 11 is placed over the sheet. Then, particles of an electron accepting material are filled in between the sheet and the refractory 15 to form an electron acceptor 13, and particles of an electron donating material are filled in between the sheet and the container body 11 to form an electron donor 12. According to this method, a glass manufacturing container 10 can be very easily manufactured, for example, as compared to the case where each of the electron donor 12 and the electron acceptor 13 is individually formed into a film. Furthermore, even if the container body 11 has a complicated shape, a glass manufacturing container 10 can be easily manufactured. Moreover, it is not necessary to previously form films on the container body 11. Therefore, in assembling a glass manufacturing apparatus, the electron donor 12 and the electron acceptor 13 can be easily formed.

(Second Embodiment)

In the first embodiment, the glass manufacturing container 10 has been described as an example of a glass manufacturing container practicing the present invention. In the present invention, however, the glass manufacturing container is not limited to the glass manufacturing container 10. The glass manufacturing container may be, for example, a molten glass carrier pipe. In this embodiment, a description will be given of a molten glass carrier pipe, which is a kind of glass manufacturing container, with reference to FIG. 2.

In the description of this embodiment, elements having substantially the same functions as those in the first embodiment are identified by the same reference numerals and a description of them is not given.

Figure 2:
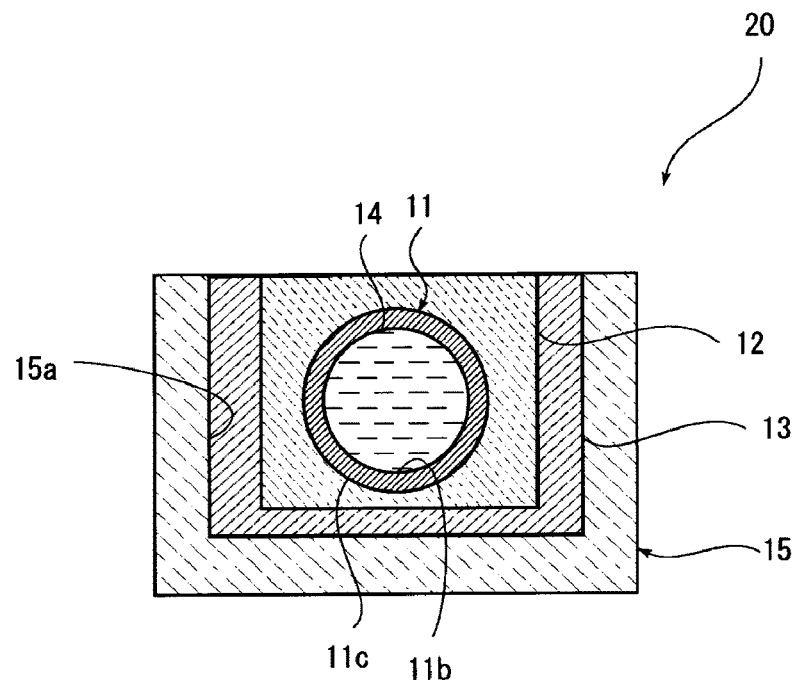
FIG. 2 is a schematic transverse cross-sectional view of a molten glass carrier pipe of the second embodiment.

FIG. 2 is a schematic transverse cross-sectional view of a molten glass carrier pipe of the second embodiment. As shown in FIG. 2, a container body 11 in the molten glass carrier pipe 20 of this embodiment is formed into a cylindrical shape. An electron donor 12 is disposed to cover the container body 11. Disposed on the outside of the electron donor 12 is an electron acceptor 13 to cover the electron donor 12.

Like the first embodiment, in this embodiment, the electron donor 12 is in contact with the container body 11, whereby electrons can be donated to the container body 11. Therefore, the production of oxygen gas due to water or OH⁻ ions in molten glass can be effectively reduced. In addition, since also in this embodiment the electron acceptor 13 is provided, the production of oxygen gas can be more effectively reduced.

(Third Embodiment)

In this embodiment, with reference to FIG. 3, a description will be given of a glass manufacturing apparatus using the glass manufacturing container 10 and the molten glass carrier pipe 20 which have been described in the first and second embodiments. Note that the glass manufacturing apparatus of this embodiment is an apparatus for forming a glass substrate for a display by an overflow downdraw process.

Figure 3:
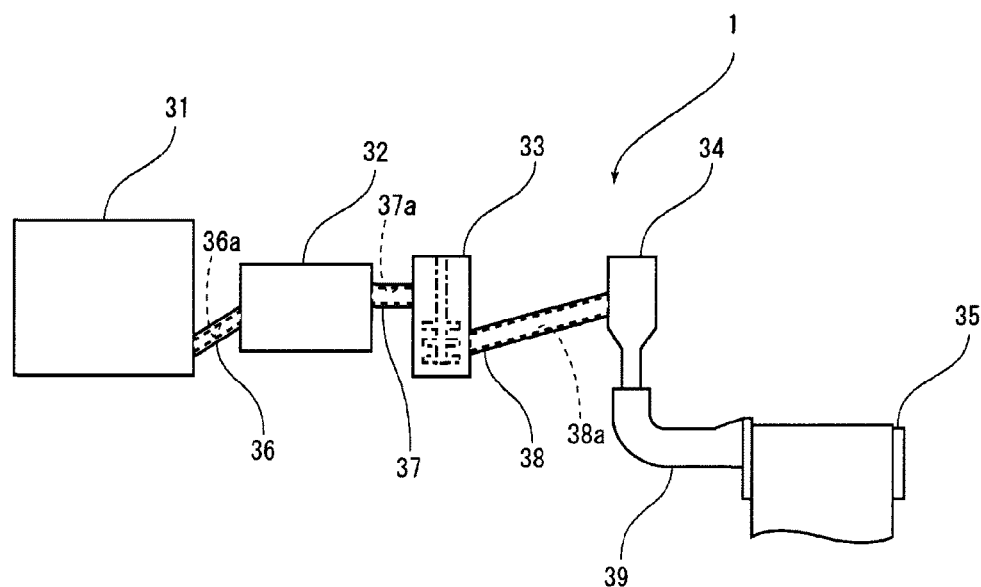
FIG. 3 is a schematic block diagram of a glass manufacturing apparatus of the third embodiment.

As shown in FIG. 3, the glass manufacturing apparatus 1 includes a melting container 31, a refining container 32, a stirring container 33, a pot 34, a forming member 35, and an unshown heated body. The melting container 31 is a container for melting glass raw material (batch) loaded thereinto. The melting container 31 is connected to the refining container 32 through a first connecting passage 36*a* formed inside a first connecting member 36. The refining container 32 is a container for refining molten glass supplied from the melting container 31. The refining container 32 is connected to the stirring container 33 through a second connecting passage 37*a* formed inside a second connecting member 37. The stirring container 33 is a container for stirring the refined molten glass to homogenize it. The stirring container 33 is connected to the forming member 35 through a third connecting passage 38*a* formed inside a third connecting member 38, the pot 34 and a pipe 39.

In this embodiment, at least one of the containers 31 to 33, the pot 34, the connecting members 36 to 38, the pipe 39 and the forming member 35 is composed of the glass manufacturing container 10 or the molten glass carrier pipe 20. Specifically, the melting container 31 and the forming member 35 are each composed of a refractory furnace made of a refractory, and each of the refining container 32, the stirring container 33, the pot 34, the connecting members 36 to 38 and the pipe 39 is composed of the glass manufacturing container 10 or the molten glass carrier pipe 20. Therefore, according to the glass manufacturing apparatus 1 of this embodiment, glass can be manufactured which has a reduced number of bubbles left therein.

The melting container 31 may also be composed of the glass manufacturing container 10. However, the glass manufacturing container practicing the present invention need not necessarily be applied to any glass manufacturing container upstream of the refining container 32.

Hereinafter, a description will be given of modified embodiments of the glass manufacturing container. Note that in the following description of the modified embodiments, elements having substantially the same functions as those in the above embodiments are identified by the same reference numerals and a description of them is not given.

(First Modified Embodiment)

In the first and second embodiments, the description has been given of the glass manufacturing container in which each of the electron donor 12 and the electron acceptor 13 is composed of a layer of a large number of particles. However, the present invention is not limited to this structure. For example, each of the electron donor 12 and the electron acceptor 13 may be made of a film. More specifically, each of the electron donor 12 and the electron acceptor 13 may be made of a film of sintered body. In this case, the contact area between the electron donor 12 and the container body 11 and the contact area between the electron donor 12 and the electron acceptor 13 can be increased, whereby the formation of bubbles can be more effectively reduced.

(Second and Third Modified Embodiments)

Figure 4:
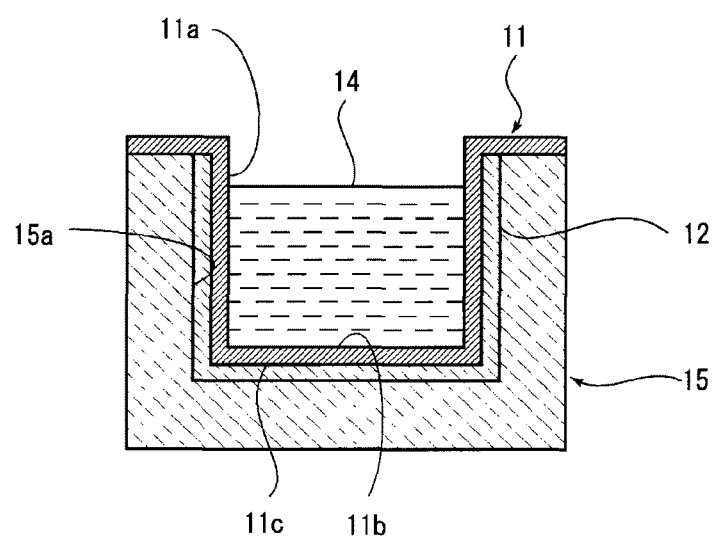
FIG. 4 is a schematic cross-sectional view of a glass manufacturing container of the second modified embodiment.
Figure 5:
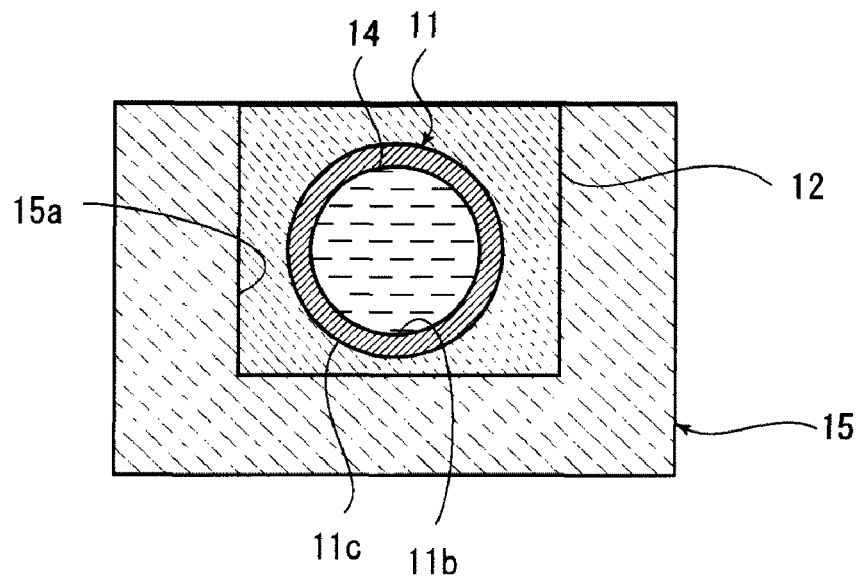
FIG. 5 is a schematic transverse cross-sectional view of a molten glass carrier pipe of the third modified embodiment.

FIG. 4 is a schematic cross-sectional view of a glass manufacturing container of the second modified embodiment which is a modified embodiment of the first embodiment. FIG. 5 is a schematic transverse cross-sectional view of a molten glass carrier pipe of the third modified embodiment which is a modified embodiment of the second embodiment.

In the first and second embodiments, the description has been given of the glass manufacturing container in which the electron acceptor 13 is provided. In the second and third modified embodiments, as shown in FIGS. 4 and 5, the electron donor 12 is provided but the electron acceptor 13 is not provided. Even in this case, the formation of bubbles due to water or OH⁻ ions in molten glass can be effectively reduced.

(Fourth and Fifth Modified Embodiments)

Figure 6:
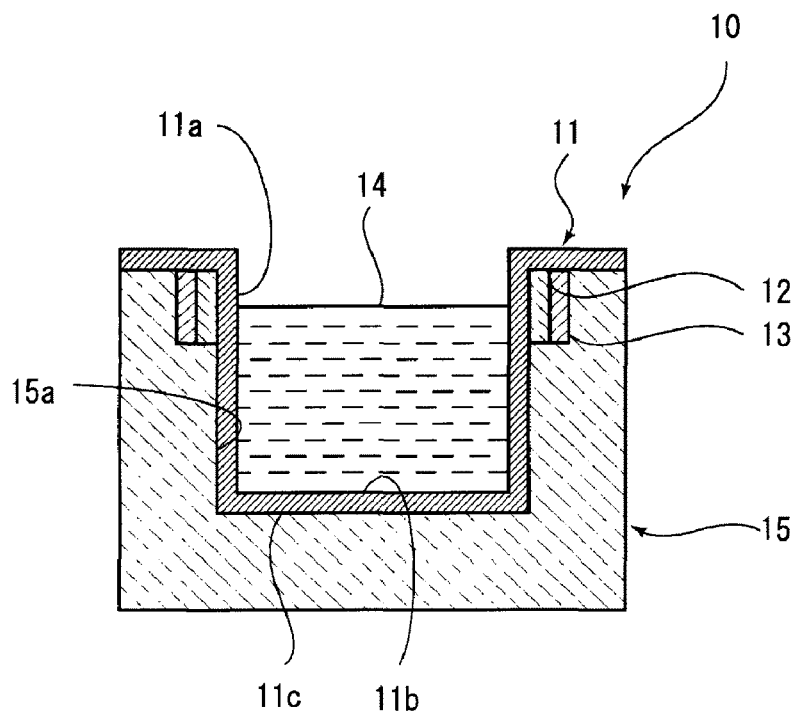
FIG. 6 is a schematic cross-sectional view of a glass manufacturing container of the fourth modified embodiment.
Figure 7:
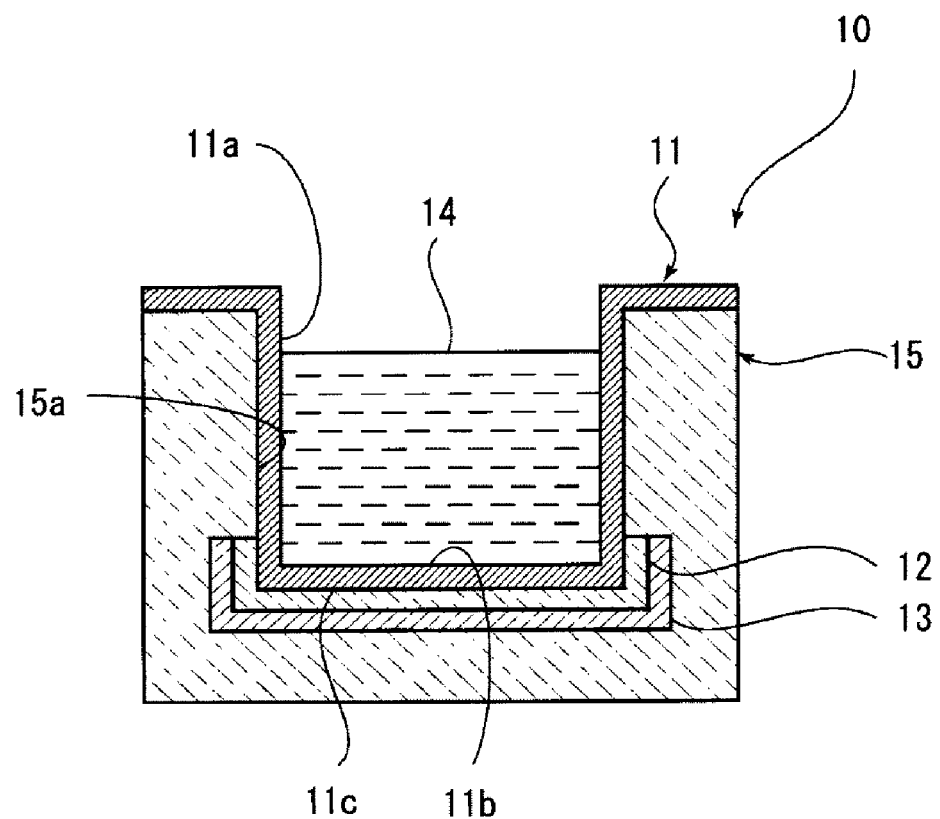
FIG. 7 is a schematic cross-sectional view of a glass manufacturing container of the fifth modified embodiment.

In the first embodiment, the description has been given of the glass manufacturing container in which the electron donor 12 is brought into contact with the entire surface of the outside wall of the recess 11*a* of the container body 11. However, the present invention is not limited to this structure. For example, in the fourth modified embodiment, as shown in FIG. 6, the electron donor 12 is brought into contact only with a wall portion of the container body 11 located outside a contact part of the container body 11 with the interface of molten glass 14 and a surrounding part thereof. In the fifth modified embodiment, as shown in FIG. 7, the electron donor 12 is brought into contact only with a wall portion of the container body 11 located outside the bottom of the container body 11.

The portion of the container body 11 with which the electron donor 12 is to be brought into contact can be appropriately determined depending upon in which part of the inner surface 11b of the container body 11 bubbles are likely to be formed.

Hereinafter, the present invention will be described in more detail. However, the present invention is not at all limited by the following examples, and can be embodied in various other forms appropriately modified without changing the spirit of the invention.

FIRST EXPERIMENTAL EXAMPLE

Figure 8:
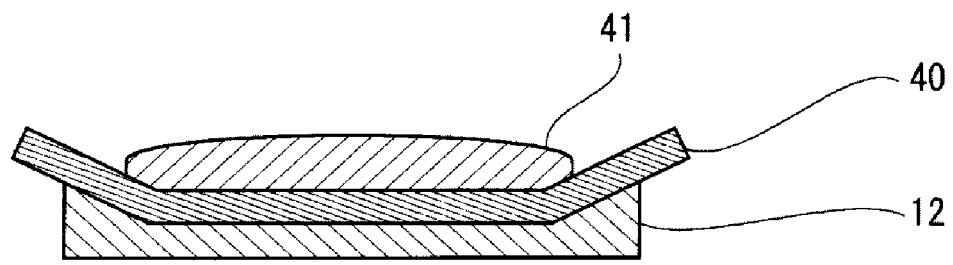
FIG. 8 is a schematic cross-sectional view for illustrating the first experimental example.

In this experimental example, an experiment was conducted for confirming the effects obtained by bringing an electron donor into contact with a glass manufacturing container. Specifically, as shown in FIG. 8, a plate 40 made of Pt was first placed on an electron donor 12 made of powder of an electron donating material, a mass of glass 41 was put on the Pt plate 40, allowed to stand at 1550° C. for 15 minutes and then cooled to a room temperature, and bubbles in the glass were visually observed. In addition, an experiment was conducted, as the first comparative example, also on the case where the electron donor 12 was not provided, and bubbles in the glass were visually observed. In the first experimental example and the first comparative example, Neoceram (β-OH: 0.4/mm) which is $Li_2O$—$Al_2O_3$—$SiO_2$-based glass manufactured by Nippon Electric Glass Co. Ltd. was used.

Figure 9:
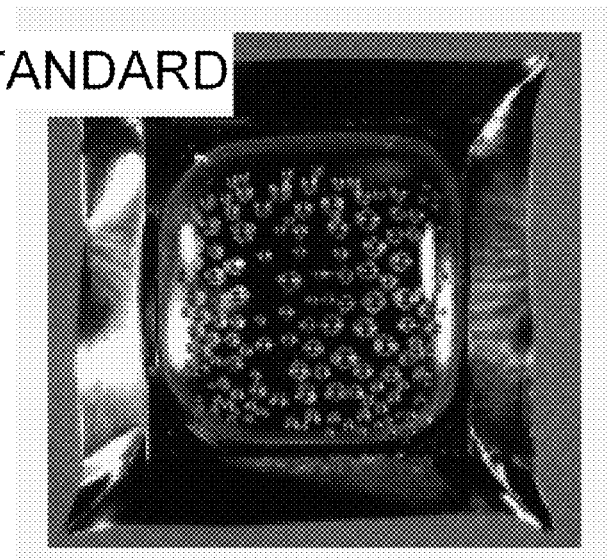
FIG. 9 is a photograph of glass in the first comparative example in which no electron donor was brought into contact with the underside of a Pt plate.
Figure 10:
FIG. 10 is a photograph of glass in the first experimental example when ZnO powder was brought as an electron donor into contact with the underside of a Pt plate.

The photograph shown in FIG. 9 is a photograph of glass obtained when the electron donor 12 was not provided. As shown in FIG. 9, when the electron donor 12 was not provided, a large number of bubbles with large diameters were left throughout the entire glass.

FIGS. 10 to 13 are photographs of glass samples when ZnO powder, $SnO_2$ powder, TiO2 powder and $SrTiO_3$ powder were provided as electron donors 12, respectively. As shown in FIGS. 10 to 13, when the electron donor 12 was brought into contact with the Pt plate 40 serving as a container body, the residence of bubbles in glass could be effectively reduced. These results show that the formation of bubbles can be reduced by bringing an electron donor into contact with a container body. However, the effect differs depending on the kind of electron donor. The effect of $TiO_2$ was relatively small, but when ZnO was used as an electron donor 12, the number of bubbles formed was reduced. This shows that ZnO is preferably used as an electron donor 12.

Figure 11:
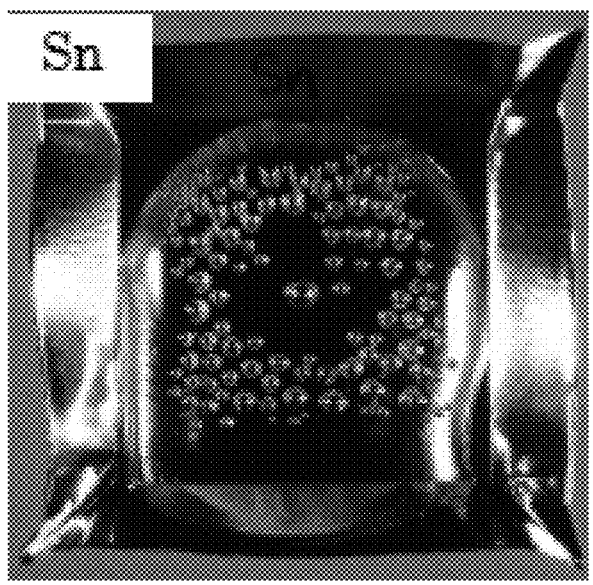
FIG. 11 is a photograph of glass in the first experimental example when SnO$_2$ powder was brought as an electron donor into contact with the underside of a Pt plate.
Figure 12:
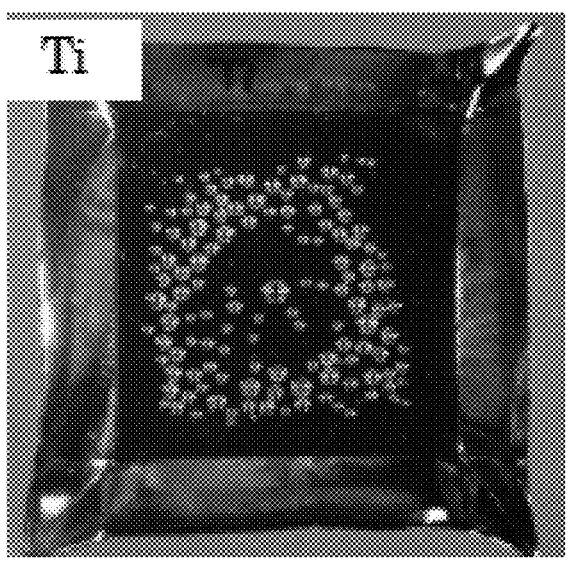
FIG. 12 is a photograph of glass in the first experimental example when TiO$_2$ powder was brought as an electron donor into contact with the underside of a Pt plate.
Figure 13:
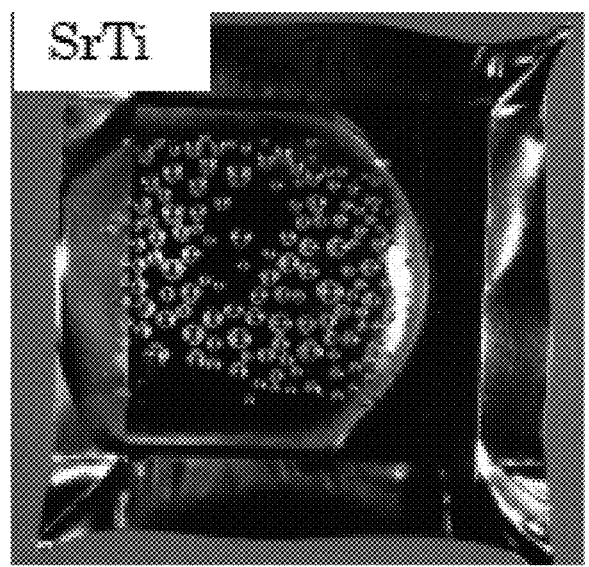
FIG. 13 is a photograph of glass in the first experimental example when SrTiO$_3$ powder was brought as an electron donor into contact with the underside of a Pt plate.

Also in each case shown in FIGS. 11 to 13, although bubbles were left in each glass sample, the number of bubbles in the center was reduced. Furthermore, in FIG. 12, the diameter of bubbles was reduced. These results shown that also in the cases shown in FIGS. 11 to 13, the formation of bubbles was reduced.

SECOND EXPERIMENTAL EXAMPLE

Figure 14:
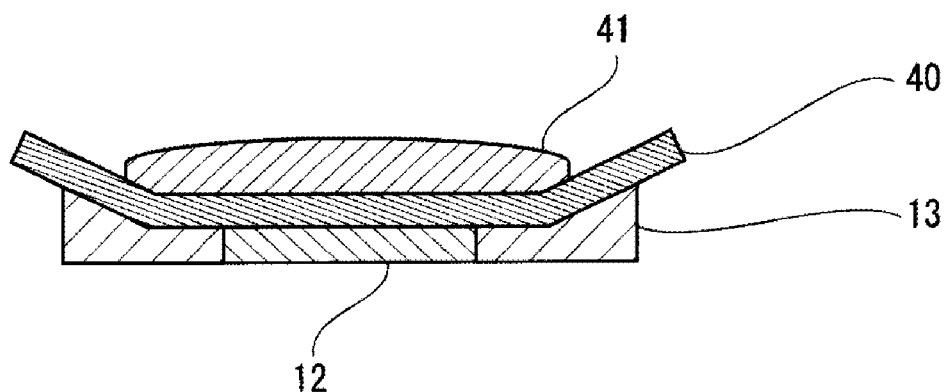
FIG. 14 is a schematic cross-sectional view for illustrating the second experimental example.

In this experimental example, an experiment was conducted for confirming the effects obtained by providing an electron acceptor. Specifically, as shown in FIG. 14, an electron donor 12 similar to that in the first experimental example was brought into contact with the center of a Pt plate 40, and an electron acceptor 13 made of Li doped NiO solid solution powder was brought into contact with the peripheral part of the Pt plate 40. Then, like the first experimental example, a mass of glass 41 was put on the plate, allowed to stand at 1550° C. for 15 minutes and then cooled to a room temperature, and bubbles in the glass were visually observed. In addition, an experiment was conducted, as the second comparative example, also on the case where the electron donor 12 and the electron acceptor 13 were not provided, and bubbles in the glass were visually observed. In the second experimental example and the second comparative example, OA-10 (β-OH: 0.55/mm) which is alkali-free glass manufactured by Nippon Electric Glass Co. Ltd. was used.

Figure 15:
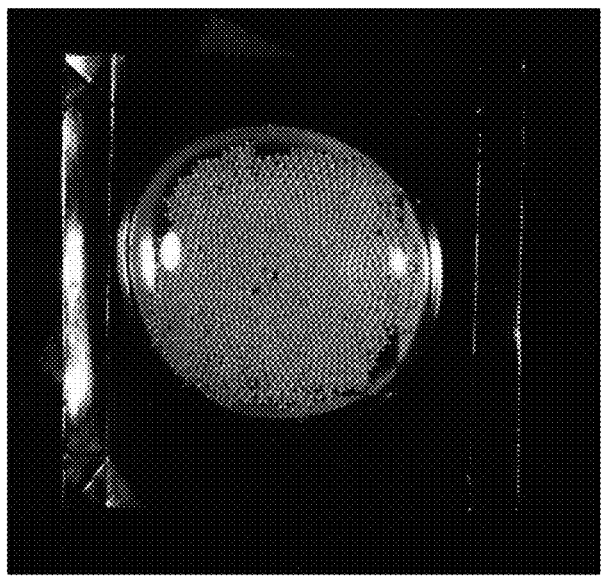
FIG. 15 is a photograph of glass in the second comparative example in which neither electron donor nor electron acceptor were brought into contact with the underside of a Pt plate.

FIG. 15 is a photograph of glass obtained by the second comparative example. As shown in FIG. 15, when the electron donor 12 and the electron acceptor 13 were not provided, a large number of bubbles were formed through the entire glass. The glass used in this experimental example was glass having a higher β-OH value than the glass used in the first experimental example, and a particularly large number of bubbles were therefore formed therein.

Figure 16:
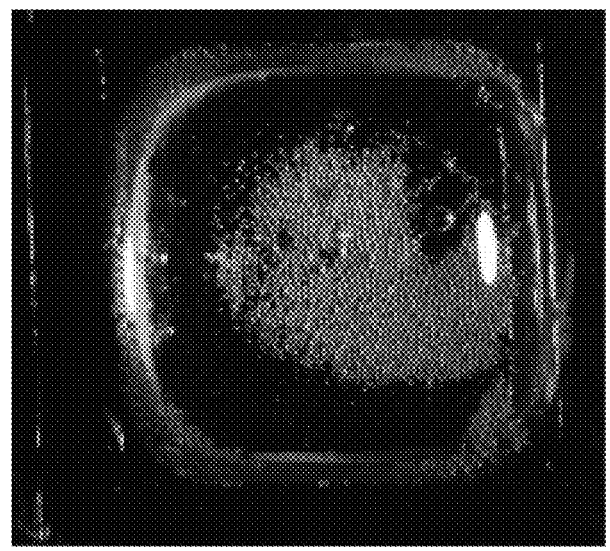
FIG. 16 is a photograph of glass in the second experimental example.

On the other hand, FIG. 16 is a photograph of glass obtained by the second experimental example. As shown in FIG. 16, the glass of the second experimental example had a smaller number of bubbles than that of the second comparative example, and the number of bubbles in the peripheral part of the glass was particularly small. These results show that the formation of bubbles can be reduced also when both the electron donor 12 and the electron acceptor 13 are brought into contact with the container body.

THIRD EXPERIMENTAL EXAMPLE

Figure 17:
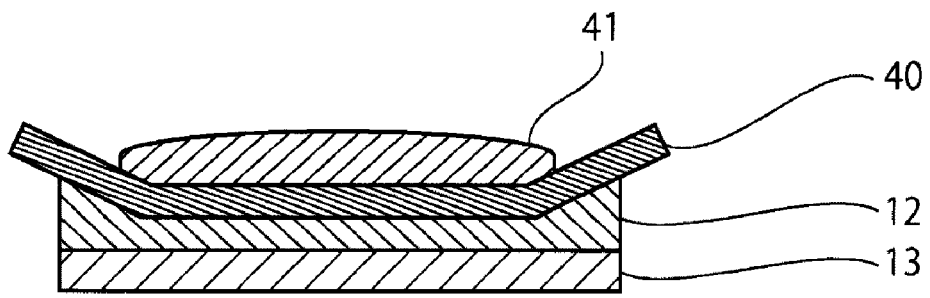
FIG. 17 is a schematic cross-sectional view for illustrating the third experimental example.
Figure 18:
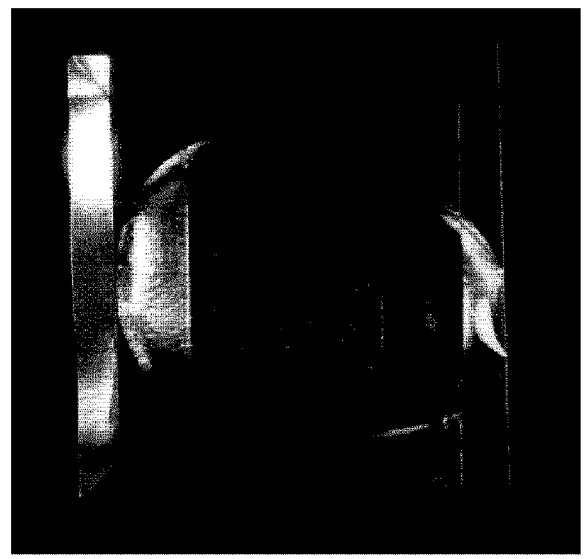
FIG. 18 is a photograph of glass in the third experimental example.

In this experimental example, as shown in FIG. 17, the same experiment as in the second experimental example was conducted except that the electron donor 12 was brought into contact with the entire surface of the Pt plate 40 and the electron acceptor 13 was brought into contact only with the underside of the electron donor 12 and kept from contact with the Pt plate 40. The results are shown in FIG. 18. As shown in FIG. 18, in this experimental example, substantially no bubble was left. This result shows that the formation of bubbles can be particularly effectively reduced by bringing an electron donor into contact with a container body and bringing an electron acceptor into contact with the opposite surface of the electron donor to the container body.

FOURTH EXPERIMENTAL EXAMPLE

Figure 19:
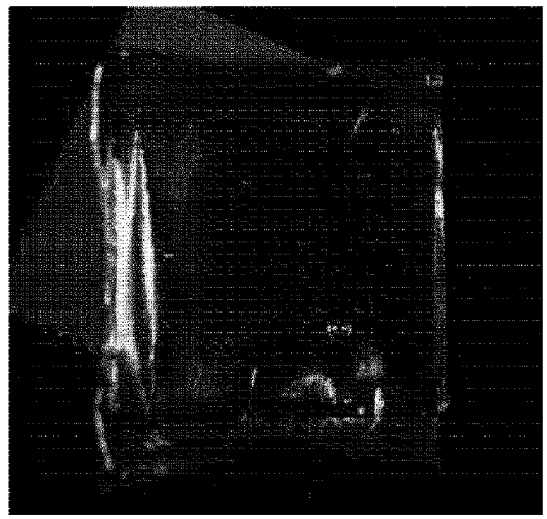
FIG. 19 is a photograph of glass in the fourth experimental example.
Figure 20:
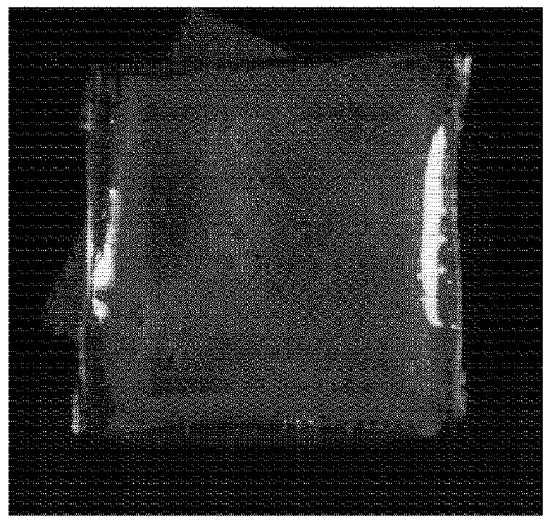
FIG. 20 is a photograph of glass in the fourth comparative example.

Using the glass manufacturing container 10 shown in the first embodiment, OA-10 (β-OH: 0.55/mm), which is alkali-free glass manufactured by Nippon Electric Glass Co. Ltd., was melted and cooled to a room temperature. Thereafter, bubbles in the glass were visually observed. Also in the case where the electron donor 12 and the electron acceptor 13 were not provided, an experiment was likewise conducted as the fourth comparative example. Specifically, OA-10, which is alkali-free glass manufactured by Nippon Electric Glass Co. Ltd., was melted and cooled to a room temperature. Thereafter, bubbles in the glass were visually observed. The results are shown in FIGS. 19 and 20. As shown in FIGS. 19 and 20, when the electron donor 12 and the electron acceptor 13 were not provided, a large number of bubbles were left on the side and bottom of the container body 11; but when the electron donor 12 and the electron acceptor 13 were provided, substantially no bubble was observed on both the side and bottom of the container body 11. These results also show that the formation of bubbles can be effectively reduced by providing both the electron donor 12 and the electron acceptor 13.

What is claimed is:
1. A glass manufacturing container comprising:
a container body made of a precious metal or an alloy containing a precious metal and having an inner surface to be brought into contact with molten glass and an outer surface kept from contact with the molten glass;

an electron donor electrically connected to the outer surface of the container body and made of an electron donating material capable of donating electrons to the container body at operating temperatures; and an electron acceptor electrically connected to the electron donor; wherein the electron donating material is an n-type ceramic at 25° C.

2. The glass manufacturing container of claim 1, wherein the Fermi level of the electron acceptor is at a lower energy level than that of the electron donating material.

3. The glass manufacturing container of claim 1, wherein the electron acceptor is a p-type ceramic at 25° C.

4. The glass manufacturing container of claim 1, wherein the electron acceptor is an oxide containing one or more kinds of metals selected from the group consisting of Cu, Ni, Co, Mn and Li.

5. The glass manufacturing container of claim 4, wherein the electron acceptor is NiO doped with Li.

6. A glass manufacturing apparatus comprising the glass manufacturing container of claim 1.

7. The glass manufacturing apparatus of claim 6, comprising:

a melting container for melting glass raw material;

a refining container for refining the molten glass;

a stirring container for stirring the refined molten glass;

a forming member for forming the molten glass;

a first connecting member in which a connecting passage connecting the melting container to the refining container is formed;

a second connecting member in which a connecting passage connecting the refining container to the stirring container is formed; and a third connecting member in which a connecting passage connecting the stirring container to the forming member is formed, wherein at least one of the melting container, the refining container, the stirring container, the forming member and the first to third connecting members is composed of the glass manufacturing container.

\* \* \* \* \*